United States Patent Office

3,658,908
Patented Apr. 25, 1972

3,658,908
DIBENZO[a,e]CYCLOPROPA[c]CYCLOHEPTENE
DERIVATIVES
William E. Coyne and John W. Cusic, Skokie, Ill.,
assignors to G. D. Searle & Co., Chicago, Ill.
No Drawing. Filed May 31, 1968, Ser. No. 733,261
Int. Cl. C07c 49/76
U.S. Cl. 260—590    3 Claims

ABSTRACT OF THE DISCLOSURE

Tetrahydrodibenzo[a,e]cyclopropa[c]cycloheptene 5-ketones and 5-alcohols are described herein. They are prepared by starting from 5H-dibenzo[a,e]cyclohepten-5-one and ethyl trichloroacetate and are themselves useful as intermediates in the preparation of other compounds which possess pharmacological activity such as diuretic activity or anti-depressant activity.

SUMMARY OF THE INVENTION

The present invention relates to a number of derivatives of 1,1a,6,10b - tetrahydrodibenzo[a,e]cyclopropa[c]cycloheptene. The structure and the numbering of the ring system involved is as follows:

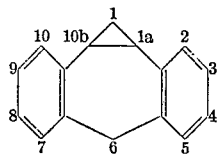

More particularly, the present invention relates to compounds having the following general formula

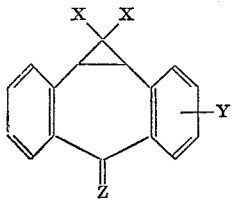

wherein X is selected from the group consisting of hydrogen and chlorine; Y is selected from the group consisting of hydrogen and chlorine; and =Z is selected from the group consisting of =O and =HOH.

The compounds of the present invention are prepared by the reaction of dichlorocarbene with a dibenzocycloheptenone of the formula

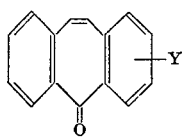

wherein Y is defined as above. The dichlorocarbene is preferably obtained by the reaction of sodium methoxide with ethyl trichloroacetate. The indicated reaction gives a 1,1 - dichloro-1,1a,6,10b-tetrahydrodibenzo[a,e]cyclopropa[c]cyclohepten-6-one. Reduction of this ketone can be carried out either selectively to reduce only the carbonyl group or it can be carried out non-selectively to reduce the ketone to the alcohol and reduce off the chlorine substituents at the same time. In the first instance, a hydride reducing agent such as sodium borohydride can be used while in the latter instance, the reducing agent is lithium and t-butyl alcohol. Where selective reduction is used, the resulting dichloro alcohol can be further reacted with lithium and t-butyl alcohol to reduce off the two halogen atoms. Actually, this two step procedure is the preferred method for obtaining the tetracyclic alcohol without the chlorine atoms substituted at the 1-posiion. The tetracyclic alcohol can then be oxidized with an agent such as chromium trioxide to give the corresponding tetracyclic ketone.

A variety of pharmacologically active compounds can be prepared from the ketones of the present invention. Thus, reaction of the ketones with a di(lower alkyl)amino(lower alkyl) or a (cyclic amino)(lower alkyl) Grignard reagent gives the corresponding amino alcohol. More specifically, 3-dimethylaminopropylmagnesium chloride gives an amino alcohol of the formula

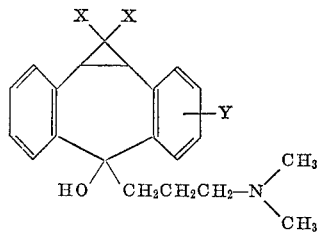

wherein X and Y are defined as above. The dichloro compound can be reduced with lithium and t-butyl alcohol to give the corresponding compound in which X is hydrogen. Reaction of this alcohol with acetic anhydride gives the corresponding acetate ester, for example, 6-acetoxy-6 - (3-dimethylaminopropyl) - 1,1a,6,10b - tetrahydrodibenzo[a,e]cyclopropa[c]cycloheptene. This compound possesses diuretic activity.

Diuretic activity is determined by a modification of the method of Lipschitz et al., J. Pharmacol. Exper. Therap., 79, 97 (1943). Intact male Badger rats (275–400 grams) are dosed orally with 25 ml./kg. of 0.86% aqueous sodium chloride containing a standard dose (0.6 mg./kg.) of hydrochlorothiazide, the reference standard. Other groups of 10 animals are treated orally with the test compound dissolved or suspended in the saline load at a dose of 24 mg./kg. The animals are placed in metabolism cages (2 per cage) and pooled samples of urine from each group representing a given treatment are collected after 5 hours. The pooled samples are measured for total volume and sodium. Potency is then determined on the basis of the dose of hydrochlorothiazide which produces equivalent degrees of diuresis with respect to urine volume and sodium output. In this test, 6-acetoxy-6-(3-dimethylaminopropyl)-1,1a,6,10b - tetrahydrodibenzo[a,e]cyclopropa[c]cycloheptene (oxalate) was found to be active as a diuretic agent at 24 mg./kg.

Other pharmacologically active compounds can also be prepared from the compounds of the present invention. Thus, the 1,1-dichloro alcohols obtained from the Grignard reaction described earlier can be dehydrated with hydriodic acid to give the correspondnig di(lower alkyl) amino- or (cyclic amino)-lower alkylidene compounds. Compounds of this type also possess diuretic activity as do the alcohols which are dehydrated.

The above 1,1-dichloro-6-aminoalkylidene-1,1a,6,10b-tetrahydrodibenzo[a,e]cyclopropa[c]cycloheptenes can further be reduced with lithium and t-butyl alcohol to remove the two halogens and reduce the alkylidene double bond. The resultant compounds would be 6-di(lower alkyl)amino(lower alkyl)- or 6-(cyclic amino)(lower alkyl)-1,1a,6,10b - tetrahydrodibenzo[a,e]cyclopropa[c] cycloheptenes, a group of compounds possessing anti-depressant activity. The anti-depressant activity is determined in mice by a standard procedure. Thus, mice weighing 20–30 grams are first administered the test compound intragastrically and then, 1 hour later, there is administered intraperitoneally 20 mg./kg. of 2-hydroxy-2-ethyl-3-isobutyl-9,10 - dimethoxy-1,2,3,4,6,7-hexahydro-11bH-benzo[a]quinolizine, a synthetic compound with reserpine-like activity. The indicated dose of the reserpine-like compound produces essentially complete ptosis in the animals one-half hour after administration. A compound is rated active if it antagonizes this ptosis. 6-(3-dimethylaminopropyl) - 1,1a,6,10b-tetrahydrodibenzo[a,e] cyclopropa[c]cycloheptane (oxalate) was active in this test at a dose of 50 mg./kg.

The following examples are presented to further illustrate the invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

Example 1

To a stirred solution of 60 parts of 5H-dibenzo[a,d] cyclohepten-5-one in 880 parts of benzene and 200 parts by volume of hexane at 0–5° C. is added 60 parts of sodium methoxide followed by the protionwise addition of 200 parts of ethyl trichloroacetate over a period of 1 hour. The resulting suspension is stirred at 0–5° C. for 5 hours and then allowed to come to room temperature over a period of 18 hours. 200 parts of water is added and the benzene is separated, washed with water and dried over magnesium sulfate. Evaporation of the benzene solvent leaves a residual oil which is dissolved in 240 parts of hot ethanol, treated with charcoal, and filtered. Crystals form almost immediately in the filtrate and these are separated by filtration, washed with ethanol, and dried to give 1,1-dichloro-1,1a,6,10b-tetrahydrodibenzo[a,e]cyclopropa[c]cyclohepten - 6 - one melting at about 129–131° C. This compound has the following formula

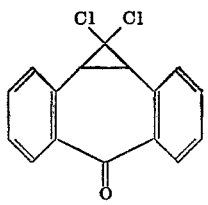

Example 2

To a stirred suspension of 10.0 parts of 1,1-dichloro-1,1a,6,10b - tetrahydrodibenzo[a,e]cyclopropa[c]cyclohepten-6-one in 240 parts of methanol is added 3.0 parts of sodium borohydride. The mixture is stirred for 15 minutes at 25° C. and then refluxed for 2 hours before it is poured into 1000 parts of water containing 30 parts of concentrated hydrochloric acid. The solid precipitate which forms is separated by filtration, washed with water, and air dried to give 1,1-dichloro-1,1a,6,10b-tetrahydrodibenzo[a,e]cyclopropa[c]cyclohepten - 6 - ol melting at about 164–168° C.

Example 3

A solution of 30 parts of 1,1-dichloro-1,1a,6,10b-tetrahydrodibenzo[a,e]cyclopropa[c]cyclohepten-6-ol in 270 parts of tetrahydrofuran is prepared and stirred, 2.5 parts of lithium amide is added, and the resulting suspension is stirred for 30 minutes. 12 parts of lithium wire and 9 parts of t-butyl alcohol are added concomitantly over a period of about 1.5 hours. The reaction mixture is cooled from time to time to keep the mixture below reflux temperature. Once the addition is complete, the mixture is stirred for 1 hour and excess lithium is decomposed by the cautious addition of water. The mixture is then further diluted with water and extracted with ether. The combined ether extracts are washed with water and dried over magnesium sulfate. Evaporation of the ether solvent leaves a residual solid which is recrystallized from ethanol to give 1,1a,6,10b-tetrahydrodibenzo[a,e]cyclopropa[c]cyclohepten-6-ol melting at about 142–152° C. This compound has the following formula

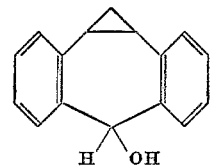

Example 4

To a stirred solution of 20 parts of 1,1-dichloro-1,1a,6,10b - tetrahydrodibenzo[a,e]cyclopropa[c]cyclohepten-6-one in 270 parts of tetrahydrofuran is added 5 parts of lithium wire over a period of 1 hour together with enough t-butyl alcohol to maintain the reaction. The mixture is then stirred for 1 hour and an additional 5 parts of lithium wire is added under the same conditions. Excess t-butyl alcohol is added and the mixture is stirred at room temperature for 18 hours. Excess lithium is then decomposed by the addition of 300 parts of water. The organic layer is then separated and the aqueous layer is extracted with ether. The organic layers are combined and dried over magnesium sulfate. The solvent is then evaporated and the residue is chromatographed. The column is first eluted with benzene and then with 5% ethyl acetate in benzene. Evaporation of the solvent from the latter eluate gives 1,1a,6,10b-tetrahydrodibenzo[a,e] cyclopropa[c]cyclohepten-6-ol melting at about 130–150° C.

Example 5

To a stirred solution of 8.8 parts of 1,1a,6,10b-tetrahydrodibenzo[a,e]cyclopropa[c]cyclohepten - 6 - ol in 16 parts of acetone is added dropwise 14 parts by volume of Jones reagent (a solution of chromic acid and sulfuric acid in water). The resulting mixture is stirred for an additional 15 minutes and poured into water. It is then extracted with ether and the ether extracts are washed well with water and dried over magnesium sulfate. The solvent is evaporated to leave a crystalline residue. This is recrystallized from ethanol to give 1,1a,6,10b-tetrahydrodibenzo[a,e]cyclopropa[c]cyclohepten - 6 - one melting at about 79–82° C. This compound has the following formula

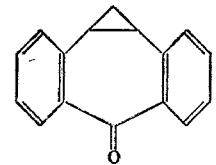

Example 6

To 2.43 parts of magnesium in a dry flask there is added, with stirring, 9 parts of tetrahydrofuran, 0.5 part of ethyl bromide, and a crystal of iodine, followed by the portionwise addition of a solution of 15 parts of freshly distilled 3-dimethylaminopropyl chloride in 18 parts of tetrahydrofuran. At the end of the addition, almost all of the magnesium has reacted. To this solution is then added a solution of 10 parts of 1,1 - dichloro-1,1a,6,10b - tetrahydrodibenzo[a,e]cyclopropa[c]cyclohepten-6-one in 90 parts of tetrahydrofuran portionwise. The mixture is refluxed for 2 hours and then poured into 500 parts of water containing 20 parts of ammonium chloride. The solid which forms is separated by filtration and washed with water to give 1,1 - dichloro - 6 - (3-dimethylaminopropyl) - 1,1a,6,10b - tetrahydrodibenzo[a,e]cyclopropa[c]cyclohepten - 6 - ol melting at about 170–171° C. This compound has the following formula

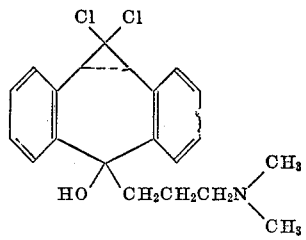

The precipitate which forms is separated by filtration and recrystallized from ethanol to give 6 - acetoxy - 6 - (3-dimethylaminopropyl) - 1,1a,6,10b - tetrahydrodibenzo[a,e]cyclopropa[c]cycloheptene oxalate melting at about 150–153° C. The free base of this compound has the following formula

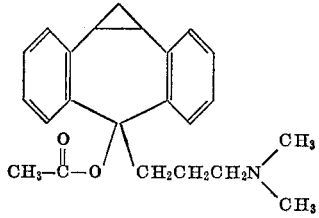

Example 7

3-dimethylaminopropylmagnesium chloride is prepared from 2.43 parts of magnesium and 2 parts of 3-dimethylaminopropyl chloride in 27 parts of tetrahydrofuran according to the procedure described in Example 6. To this solution is addd, with stirring, a solution of 1.2 parts of 1,1a,6,10b - tetrahydrodibenzo[a,e]cyclopropa[c]cyclohepten-6-one in 18 parts of tetrahydrofuran. The solution is refluxed for 2 hours and then poured into an excess of water containing 5 parts of ammonium chloride. The resulting mixture is extracted with ether and the combined ether extracts are washed with water and dried over potassium carbonate. Evaporation of the solvent leaves a white precipitate which is recrystallized from a mixture of ethanol and hexane to give 6-(3 - dimethylaminopropyl) - 1,1a,6,10b - tetrahydrodibenzo[a,e]cyclopropa[c]cyclohepten-6-ol melting at about 134–136° C.

Example 8

To a stirred solution of 3.8 parts of 1,1 - dichloro-6-(3 - dimethylaminopropyl) - 1,1a,6, 10b - tetrahydrodibenzo[a,e]cyclopropa[c]cyclohepten - 6 - ol in 27 parts of tetrahydrofuran is added, under nitrogen, 0.23 part of lithium amide. The suspension is stirred for 30 minutes at room temperature and then 1.1 parts of t-butyl alcohol is added, followed by 2 parts of lithium wire over a period of 1 hour. An exothermic but controllable reaction ensues but this subsides by the end of the addition. The mixture is then stirred for an additional hour and decomposed by the careful addition of water. It is then further diluted with water and extracted with ether. The ether extracts are dried over potassium carbonate and the solvent is evaporated to leave a residual yellow solid. This is recrystallized from ethanol to give 6 - (3 - dimethylaminopropyl) - 1,1a,6,10b - tetrahydrodibenzo[a,e]cyclopropa[c]cyclohepten - 6 - ol melting at about 130–135° C.

Example 9

A solution of 0.5 part of 6 - (3 - dimethylaminopropyl) - 1,1a,6,10b - tetrahydrodibenzo[a,e]cyclopropa[c]cyclohepten-6-ol in 10 parts of acetic anhydride is refluxed for 3 hours. The excess anhydride is then removed under reduced pressure and the residue is triturated with aqueous potassium carbonate and ether. The ether layer is then separated and dried over potassium carbonate. The solvent is evaporated to leave a residual oil which is 6 - acetoxy - 6 - (3 - dimethylaminopropyl) - 1,1a, 6,10b - tetrahydrodibenzo[a,e]cyclopropa[c]cycloheptene. The oil is dissolved in ethanol and mixed with a saturated solution of excess oxalic acid in ethanol.

Example 10

A solution of 1.0 part of 1,1-dichloro-6-(3-dimethylaminopropyl - 1,1a,6,10b - tetrahydrodibenzo[a,e]cyclopropa[c]cyclohepten-6-ol, 4 parts of 47% hydriodic acid, 5 parts of acetic acid, and 1 part of concentrated hydrochloric acid is refluxed for 2 hours. The resulting mixture is poured into an aqueous potassium carbonate solution. This is extracted with ether and the combined ether extracts are washed with water and dried over potassium carbonate. Evaporation of the solvent leaves a colorless oil which is 1,1-dichloro-6-(3-dimethylaminopropylidene)-1,1a,6,10b - tetrahydrodibenzo [a,e] cyclopropa[c]cycloheptene. The oil is dissolved in ethanol and treated with an ethanol solution of oxalic acid. The precipitate which forms is separated by filtration and recrystallized from ethanol to give 1,1 - dichloro-6-(3-dimethylaminopropylidene) - 1,1a,6,10b-tetrahydrodibenzo[a,e]cyclopropa[c]cycloheptene oxalate melting at about 166–167° C. The free base of this compound has the following formula

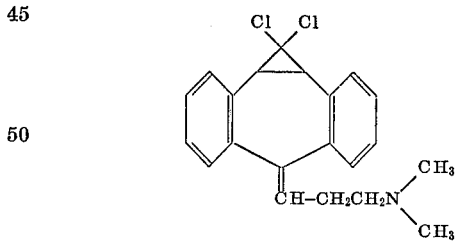

Example 11

To a stirred solution of 7.3 parts of 1,1-dichloro-6-(3-dimethylaminopropylidene) - 1,1a,6,10b - tetrahydrodibenzo[a,e]cyclopropa[c]cycloheptene in 55 parts of tetrahydrofuran is added 0.46 part of lithium amide and the resulting suspension is stirred for 1 hour. Addition of 3 parts of t-butyl alcohol followed by 4.0 parts of lithium wire over a period of 1 hour gives an exothermic reaction. The mixture is then stirred for an additional hour and decomposed by the careful addition of water. It is then further diluted with water, the organic layer is separated, and the aqueous layer is extracted with ether. The organic layers are then combined and dried over potassium carbonate. Evaporation of the solvent gives a dark oil. The oil is mixed with ethanol and the insoluble material is separated and discarded. The remaining oil is chromatographed on an alumina column. The column is eluted with benzene containing increasing quantities of ethyl acetate. The solvent is evaporated from the portion eluted with 5% ethyl acetate in benzene to leave a residual oil which is 6-(3-dimethylaminopropyl)-1,1a,6,10b-tetrahydrodibenzo[a,e]cyclopropa[c]cycloheptene. This oil is dissolved in ethanol and mixed with an ethanol solution of oxalic acid. The resulting ethanol solution is further diluted with ether, whereupon a precipitate forms. This is separated by filtration and recrystallized from ethanol to give 6-(3-dimethylaminopropyl)-1,1a,6,10b-tetrahydrodibenzo[a,e]cyclopropa[c]cycloheptene oxalate melting at about 175–178° C. The free base of this compound has the folliowing formula

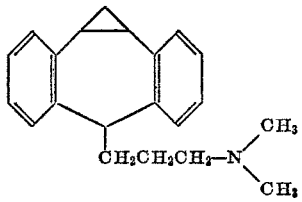

What is claimed is:
1. A compound of the formula

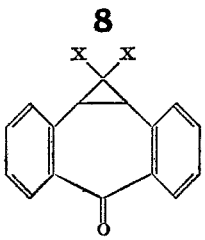

wherein X is selected from the group consisting of hydrogen and chlorine.

2. A compound according to claim 1 which is 1,1-dichloro - 1,1a,6,10b - tetrahydrodibenzo[a,e]cyclopropa[c]cyclohepten-6-one.

3. A compound according to claim 1 which is 1,1a,6,10b - tetrahydrodibenzo[a,e]cyclopropa[c]cyclohepten-6-one.

References Cited
UNITED STATES PATENTS 3,270,055   8/1966   Engelhard et al. _____ 260—566
3,475,438   10/1969  Remy _____ 260—293 AZ DANIEL D. HORWITZ, Primary Examiner U.S. Cl. X.R.

260—618 D, 618 H, 570.8, 999, 488 CD; 424—311